(12) United States Patent
Shi et al.

(10) Patent No.: US 10,869,317 B2
(45) Date of Patent: Dec. 15, 2020

(54) RESOURCE CONFIGURATION METHOD, TERMINAL DEVICE, AND NETWORK DEVICE

(71) Applicant: Guangdong OPPO Mobile Telecommunications Corp., Ltd., Guangdong (CN)

(72) Inventors: Zhihua Shi, Dongguan (CN); Wenhong Chen, Dongguan (CN); Zhi Zhang, Dongguan (CN)

(73) Assignee: Guangdong OPPO Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 16/862,000

(22) Filed: Apr. 29, 2020

(65) Prior Publication Data

US 2020/0260456 A1 Aug. 13, 2020

Related U.S. Application Data

(63) Continuation of application No. PCT/CN2017/109149, filed on Nov. 2, 2017.

(51) Int. Cl.
*H04W 72/04* (2009.01)
*H04W 76/27* (2018.01)
(Continued)

(52) U.S. Cl.
CPC ........ *H04W 72/0493* (2013.01); *H04B 1/713* (2013.01); *H04W 72/042* (2013.01);
(Continued)

(58) Field of Classification Search
CPC ......... H04W 72/0493; H04W 72/0466; H04W 72/042; H04W 76/27; H04W 80/02; H04W 72/0453; H04B 1/713
See application file for complete search history.

(56) References Cited

U.S. PATENT DOCUMENTS

2015/0327315 A1 11/2015 Xue et al.
2017/0207815 A1* 7/2017 Chae ................ H04B 1/713

FOREIGN PATENT DOCUMENTS

CN 101610101 A 12/2009
CN 102160448 A 8/2011
(Continued)

OTHER PUBLICATIONS

International Application No. PCT/CN2017/109149, International search report, dated Jun. 27, 2018, 3 pages.
(Continued)

*Primary Examiner* — Brenda H Pham
(74) *Attorney, Agent, or Firm* — Kilpatrick Townsend & Stockton LLP

(57) ABSTRACT

Embodiments of this application relate to a resource configuration method, a terminal device, and a network device. The method includes: determining a frequency domain offset between a plurality of transmission resource chunks allocated by a network device, where the frequency domain offset is a frequency domain offset between a first transmission resource chunk and a second transmission resource chunk, and the first transmission resource chunk and the second transmission resource chunk are any two consecutive resource chunks on an uplink transmission in the plurality of transmission resource chunks; and determining the plurality of transmission resource chunks according to the frequency domain offset, wherein the plurality of transmission resource chunks are configured for a frequency hopping transmission.

19 Claims, 18 Drawing Sheets

(51) Int. Cl.
*H04B 1/713* (2011.01)
*H04W 80/02* (2009.01)

(52) U.S. Cl.
CPC ... *H04W 72/0446* (2013.01); *H04W 72/0453* (2013.01); *H04W 76/27* (2018.02); *H04W 80/02* (2013.01)

(56) References Cited

FOREIGN PATENT DOCUMENTS

| | | |
|---|---|---|
| CN | 106658742 A | 5/2017 |
| CN | 106850165 A | 6/2017 |

OTHER PUBLICATIONS

3GPP TS 36.211 V860, Mapping to physical resources ( uplink frequency-hopping), published on Mar. 2019.
European Patent Application No. 17930863.0, European Search Report, dated Oct. 1, 2020.

* cited by examiner

200

Determine a frequency domain offset between a plurality of transmission resource blocks allocated to a terminal device, where the frequency domain offset is a frequency domain offset between a first transmission resource block and a second transmission resource block, and the first transmission resource block and the second transmission resource block are any two resource blocks adjacent to each other in time domain in the plurality of transmission resource blocks ⌇ S210

Send the frequency domain offset to the terminal device ⌇ S220

*FIG. 8*

RESOURCE CONFIGURATION METHOD, TERMINAL DEVICE, AND NETWORK DEVICE

CROSS-REFERENCES TO RELATED APPLICATIONS

This application is a continuation of and claims priority to International Patent Application No. PCT/CN2017/109149, filed on Nov. 2, 2017, the contents of which is hereby incorporated by reference in its entirety.

BACKGROUND OF THE INVENTION

Technical Field

This application relates to the communications field, and in particular, to a resource configuration method, a terminal device, and a network device.

Related Art

In a Long Term Evolution (LTE) system, frequency domain frequency hopping is introduced for uplink transmission (for example, physical uplink shared channel (PUSCH) transmission), mainly to achieve two objectives: a current terminal device can obtain a frequency domain diversity gain; and interference of another terminal device or cell is randomized.

However, if a similar LTE design is still used in a PUSCH design of a new radio (NR) system, there are the following disadvantages: frequency domain resources depending on a frequency hopping function are fragmented, and scheduling of a base station is very complex. In addition, NR differs from an LTE system, in that densities and locations of demodulation reference signals (DMRS) of different terminal devices may be different. Therefore, if a random frequency hopping manner is used, different terminal devices may perform sending at a same location, and it is very difficult to ensure that DMRS ports are orthogonal.

SUMMARY OF THE INVENTION

This application provides a resource configuration method, a terminal device, and a network device, so that the terminal device may obtain a frequency domain diversity gain and transmission resource fragmentation is avoided.

According to a first aspect, a resource configuration method is provided. The method includes: determining a frequency domain offset between a plurality of transmission resource chunks allocated by a network device, where the frequency domain offset is a frequency domain offset between a first transmission resource chunk and a second transmission resource chunk, and the first transmission resource chunk and the second transmission resource chunk are any two resource chunks adjacent to each other in time domain in the plurality of transmission resource chunks; and determining the plurality of transmission resource chunks according to the frequency domain offset.

Therefore, according to the resource configuration method in this embodiment of this application, the terminal device determines a frequency domain offset between any two neighboring transmission resource chunks of the plurality of transmission resource chunks allocated by the network device, and determines the frequency domain location of the plurality of transmission resource chunks according to the frequency domain offset. In this configuration manner, scheduling of the network device is simple, the terminal device may obtain a frequency domain diversity gain, and transmission resource fragmentation is avoided.

With reference to the first aspect, in an implementation of the first aspect, the first transmission resource chunk is an (odd number)th transmission resource chunk when the plurality of transmission resource chunks is sorted in a time order, and the second transmission resource chunk is located after the first transmission resource chunk in time domain. Correspondingly, the second transmission resource chunk is an (even number)th transmission resource chunk when the plurality of transmission resource chunks is sorted in a time order.

With reference to the first aspect and the foregoing implementations of the first aspect, in another implementation of the first aspect, the frequency domain offset is a difference between a start location of the first transmission resource chunk in frequency domain and a start location of the second transmission resource chunk in frequency domain.

Optionally, the frequency domain offset may alternatively be a difference between an end location occupied by the first transmission resource chunk in frequency domain and the start location occupied by the second transmission resource chunk in frequency domain.

Optionally, the frequency domain offset may alternatively be a difference between a center location of a frequency domain resource occupied by the first transmission resource chunk and a center location of a frequency domain resource occupied by the second transmission resource chunk.

With reference to the first aspect and the foregoing implementations of the first aspect, in another implementation of the first aspect, the first transmission resource chunk and the second transmission resource chunk separately occupy a subframe or a mini-subframe; or the first transmission resource chunk occupies a first part of a subframe and the second transmission resource chunk occupies a second part of the subframe; or the first transmission resource chunk occupies a first part of a mini-subframe and the second transmission resource chunk occupies a second part of the mini-subframe.

It should be understood that when the first transmission resource and the second transmission resource separately occupy two parts of a subframe or a mini-subframe, the two parts may be equal or unequal.

With reference to the first aspect and the foregoing implementations of the first aspect, in another implementation of the first aspect, the determining a frequency domain offset between a plurality of transmission resource chunks allocated by a network device includes receiving the frequency domain offset sent by the network device.

With reference to the first aspect and the foregoing implementations of the first aspect, in another implementation of the first aspect, the receiving the frequency domain offset sent by the network device includes: receiving a first configuration message sent by the network device, where the first configuration message is used to indicate the frequency domain offset, and the first configuration message is at least one of a network broadcast message, a network system message, a Radio Resource Control (RRC) message, a Media Access Control control element (MAC CE), and downlink control information (DCI).

With reference to the first aspect and the foregoing implementations of the first aspect, in another implementation of the first aspect, the method further includes: determining a resource area parameter, where the resource area parameter is used to indicate a frequency domain range that can be occupied by at least one transmission resource chunk of the plurality of transmission resource chunks, and the at least one transmission resource chunk includes the first transmission resource chunk or the second transmission resource chunk.

With reference to the first aspect and the foregoing implementations of the first aspect, in another implementation of the first aspect, the determining a resource area parameter includes receiving the resource area parameter sent by the terminal device.

With reference to the first aspect and the foregoing implementations of the first aspect, in another implementation of the first aspect, the receiving the resource area parameter sent by the terminal device includes: receiving a second configuration message sent by the terminal device, where the second configuration message is used to indicate the resource area parameter, and the second configuration message is at least one of a network broadcast message, a network system message, an RRC message, a MAC CE, and DCI.

With reference to the first aspect and the foregoing implementations of the first aspect, in another implementation of the first aspect, the frequency domain range that can be occupied by the at least one transmission resource chunk and that is indicated by the resource area parameter is discontinuous.

Optionally, the frequency domain range that can be occupied by the at least one transmission resource chunk and that is indicated by the resource area parameter may alternatively be continuous.

Therefore, according to the resource configuration method in this embodiment of this application, the terminal device determines a frequency domain offset between any two neighboring transmission resource chunks of the plurality of transmission resource chunks allocated by the network device, and may further determine the frequency domain range that can be occupied by at least one transmission resource chunk of the plurality of transmission resource chunks, and determines the frequency domain location of the plurality of transmission resource chunks according to the frequency domain offset and the frequency domain range that can be occupied. In this configuration manner, scheduling of the network device is simple, the terminal device may obtain a frequency domain diversity gain, and transmission resource fragmentation is avoided.

According to a second aspect, a resource configuration method is provided. The method includes: determining a frequency domain offset between a plurality of transmission resource chunks allocated to a terminal device, where the frequency domain offset is a frequency domain offset between a first transmission resource chunk and a second transmission resource chunk, and the first transmission resource chunk and the second transmission resource chunk are any two resource chunks adjacent to each other in time domain in the plurality of transmission resource chunks; and sending the frequency domain offset to the terminal device.

Therefore, according to the resource configuration method in this embodiment of this application, the network device configures the plurality of transmission resource chunks for uplink transmission of the terminal device, and sends the frequency domain offset between any two neighboring transmission resource chunks of the plurality of transmission resource chunks to the terminal device, so that the terminal device can determine the frequency domain location of the plurality of transmission resource chunks according to the frequency domain offset. Therefore, a configuration manner of the network device is simple, the terminal device may obtain a frequency domain diversity gain, and transmission resource fragmentation is avoided.

With reference to the second aspect, in an implementation of the second aspect, the first transmission resource chunk is an (odd number)th transmission resource chunk when the plurality of transmission resource chunks is sorted in a time order, and the second transmission resource chunk is located after the first transmission resource chunk in time domain.

With reference to the second aspect and the foregoing implementations of the second aspect, in another implementation of the second aspect, the frequency domain offset is a difference between a start location of the first transmission resource chunk in frequency domain and a start location of the second transmission resource chunk in frequency domain.

With reference to the second aspect and the foregoing implementations of the second aspect, in another implementation of the second aspect, the first transmission resource chunk and the second transmission resource chunk separately occupy a subframe or a mini-subframe; or the first transmission resource chunk occupies a first part of a subframe and the second transmission resource chunk occupies a second part of the subframe; or the first transmission resource chunk occupies a first part of a mini-subframe and the second transmission resource chunk occupies a second part of the mini-subframe.

With reference to the second aspect and the foregoing implementations of the second aspect, in another implementation of the second aspect, the sending the frequency domain offset to the terminal device includes: sending a first configuration message to the terminal device, where the first configuration message is used to indicate the frequency domain offset, and the first configuration message is at least one of a network broadcast message, a network system message, an RRC message, a MAC CE, and DCI.

With reference to the second aspect and the foregoing implementations of the second aspect, in another implementation of the second aspect, the method further includes: sending a resource area parameter to the terminal device, where the resource area parameter is used to indicate a frequency domain range that can be occupied by at least one transmission resource chunk of the plurality of transmission resource chunks, and the at least one transmission resource chunk includes the first transmission resource chunk or the second transmission resource chunk.

With reference to the second aspect and the foregoing implementations of the second aspect, in another implementation of the second aspect, the sending a resource area parameter to the terminal device includes: sending a second configuration message to the terminal device, where the second configuration message is used to indicate the resource area parameter, and the second configuration message is at least one of a network broadcast message, a network system message, an RRC message, a MAC CE, and DCI.

With reference to the second aspect and the foregoing implementations of the second aspect, in another implementation of the second aspect, the frequency domain range that can be occupied by the at least one transmission resource chunk and that is indicated by the resource area parameter is discontinuous.

Therefore, according to the resource configuration method in this embodiment of this application, the network device configures the plurality of transmission resource chunks for uplink transmission of the terminal device, sends the frequency domain offset between any two neighboring transmission resource chunks of the plurality of transmission resource chunks to the terminal device, and may further configure a frequency domain range that can be occupied by at least one transmission resource chunk of the plurality of transmission resource chunks for the terminal device, so that the terminal device can determine the frequency domain location of the plurality of transmission resource chunks according to the frequency domain offset and the frequency domain range that can be occupied. Therefore, a configuration manner of the network device is simple, the terminal device may obtain a frequency domain diversity gain, and transmission resource fragmentation is avoided.

According to a third aspect, a resource configuration method is provided. The method includes: determining a resource area parameter, where the resource area parameter is used to indicate a frequency domain range that can be occupied by at least one transmission resource chunk of a plurality of transmission resource chunks allocated by a network device; and determining the plurality of transmission resource chunks according to the resource area parameter.

Therefore, according to the resource configuration method in this embodiment of this application, the terminal device determines the resource area parameter, where the resource area parameter is used to indicate the frequency domain range that can be occupied by at least one transmission resource chunk of the plurality of transmission resource chunks allocated by the network device, and determines the plurality of transmission resource chunks in the range indicated by the resource area parameter, so that the terminal device may perform uplink transmission by using the plurality of transmission resource chunks, to improve transmission efficiency.

With reference to the third aspect, in an implementation of the third aspect, the determining a resource area parameter includes receiving the resource area parameter sent by the terminal device.

With reference to the third aspect and the foregoing implementations of the third aspect, in another implementation of the third aspect, the receiving the resource area parameter sent by the terminal device includes: receiving a configuration message sent by the terminal device, where the configuration message is used to indicate the resource area parameter, and the configuration message is at least one of a network broadcast message, a network system message, an RRC message, a MAC CE, and DCI.

With reference to the third aspect and the foregoing implementations of the third aspect, in another implementation of the third aspect, the frequency domain range that can be occupied by the at least one transmission resource chunk and that is indicated by the resource area parameter is discontinuous.

According to a fourth aspect, a resource configuration method is provided. The method includes: determining a resource area parameter of a terminal device, where the resource area parameter is used to indicate a frequency domain range that can be occupied by at least one transmission resource chunk of a plurality of transmission resource chunks allocated to the terminal device; and sending the resource area parameter to the terminal device.

Therefore, according to the resource configuration method in this embodiment of this application, the network device configures the plurality of transmission resource chunks for the terminal device, and sends, to the terminal device, the resource area parameter used to indicate the frequency domain range that can be occupied by at least one transmission resource chunk of the plurality of transmission resource chunks, so that the terminal device can determine the plurality of transmission resource chunks in the range indicated by the resource area parameter, and perform uplink transmission by using the plurality of transmission resource chunks, to improve transmission efficiency.

With reference to the fourth aspect, in an implementation of the fourth aspect, the sending the resource area parameter to the terminal device includes: sending a configuration message to the terminal device, where the configuration message is used to indicate the resource area parameter, and the configuration message is at least one of a network broadcast message, a network system message, an RRC message, a MAC CE, and DCI.

With reference to the fourth aspect and the foregoing implementations of the fourth aspect, in another implementation of the fourth aspect, the frequency domain range that can be occupied by the at least one transmission resource chunk and that is indicated by the resource area parameter is discontinuous.

According to a fifth aspect, a terminal device is provided, configured to perform the method according to the first aspect or any possible implementation of the first aspect. Specifically, the terminal device includes units configured to perform the method according to the first aspect or any possible implementation of the first aspect.

According to a sixth aspect, a network device is provided, configured to perform the method according to the second aspect or any possible implementation of the second aspect. Specifically, the network device includes units configured to perform the method according to the second aspect or any possible implementation of the second aspect.

According to a seventh aspect, a terminal device is provided, configured to perform the method according to the third aspect or any possible implementation of the third aspect. Specifically, the terminal device includes units configured to perform the method according to the third aspect or any possible implementation of the third aspect.

According to an eighth aspect, a network device is provided, configured to perform the method according to the fourth aspect or any possible implementation of the fourth aspect. Specifically, the network device includes units configured to perform the method according to the fourth aspect or any possible implementation of the fourth aspect.

According to a ninth aspect, a terminal device is provided, including a storage unit and a processor. The storage unit is configured to store an instruction, the processor is configured to execute the instruction stored by the memory, and when the processor executes the instruction stored by the memory, the execution enables the processor to perform the method according to the first aspect or any possible implementation of the first aspect.

According to a tenth aspect, a network device is provided, including a storage unit and a processor. The storage unit is configured to store an instruction, the processor is configured to execute the instruction stored by the memory, and when the processor executes the instruction stored by the memory, the execution enables the processor to perform the method according to the second aspect or any possible implementation of the second aspect.

According to an eleventh aspect, a terminal device is provided, including a storage unit and a processor. The storage unit is configured to store an instruction, the processor is configured to execute the instruction stored by the memory, and when the processor executes the instruction stored by the memory, the execution enables the processor to perform the method according to the third aspect or any possible implementation of the third aspect.

According to a twelfth aspect, a network device is provided, including a storage unit and a processor. The storage unit is configured to store an instruction, the processor is configured to execute the instruction stored by the memory, and when the processor executes the instruction stored by the memory, the execution enables the processor to perform the method according to the fourth aspect or any possible implementation of the fourth aspect.

According to a thirteenth aspect, a computer-readable medium is provided, configured to store a computer program. The computer program includes an instruction used to perform the method according to the first aspect or any possible implementation of the first aspect.

According to a fourteenth aspect, a computer-readable medium is provided, configured to store a computer program. The computer program includes an instruction used to perform the method according to the second aspect or any possible implementation of the second aspect.

According to a fifteenth aspect, a computer-readable medium is provided, configured to store a computer program. The computer program includes an instruction used to perform the method according to the third aspect or any possible implementation of the third aspect.

According to a sixteenth aspect, a computer-readable medium is provided, configured to store a computer program. The computer program includes an instruction used to perform the method according to the fourth aspect or any possible implementation of the fourth aspect.

According to a seventeenth aspect, a computer program product including an instruction is provided. When the computer program product runs on a computer, the computer performs the resource configuration method according to the first aspect or any possible implementation of the first aspect. Specifically, the computer program product may run on the terminal device of the fifth aspect.

According to an eighteenth aspect, a computer program product including an instruction is provided. When the computer program product runs on a computer, the computer performs the resource configuration method according to the second aspect or any possible implementation of the second aspect. Specifically, the computer program product may run on the network device of the sixth aspect.

According to a nineteenth aspect, a computer program product including an instruction is provided. When the computer program product runs on a computer, the computer performs the resource configuration method according to the third aspect or any possible implementation of the third aspect. Specifically, the computer program product may run on the terminal device of the seventh aspect.

According to a twentieth aspect, a computer program product including an instruction is provided. When the computer program product runs on a computer, the computer performs the resource configuration method according to the fourth aspect or any possible implementation of the fourth aspect. Specifically, the computer program product may run on the network device of the eighth aspect.

BRIEF DESCRIPTION OF THE DRAWINGS

FIG. 8 is a schematic flowchart of a resource configuration method according to another embodiment of this application;

DETAILED DESCRIPTION OF THE INVENTION

The following describes the technical solutions in the embodiments of this application with reference to the accompanying drawings.

The technical solutions in the embodiments of this application may be applied to various communications systems, for example, a global system for mobile communications (GSM) system, a code division multiple access (CDMA) system, a wideband code division multiple access (WCDMA) system, a general packet radio service (GPRS), an LTE system, an LTE frequency division duplex (FDD) system, LTE time division duplex (TDD), a universal mobile telecommunications system (UMTS), a worldwide interoperability for microwave access (WiMAX) communications system, and a future fifth-generation (5G) system or NR.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be further a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a future 5G network or a terminal device in a future evolved public land mobile network (PLMN), or the like. This is not limited in the embodiments of this application.

A network device in the embodiments of this application may be a device configured to communicate with a terminal device. The network device may be a base transceiver station (BTS) in a GSM system or CDMA, or may be an NodeB (NB) in a WCDM system, or may be an evolved NodeB (eNB or eNodeB) in an LTE system, or may be a wireless controller in a cloud radio access network (CRAN) scenario, or the network device may be a relay station, an access point, an in-vehicle device, a wearable device, a network device in a future 5G network or a network device in a future evolved PLMN network, or the like. This is not limited in the embodiments of this application.

Figure 1:
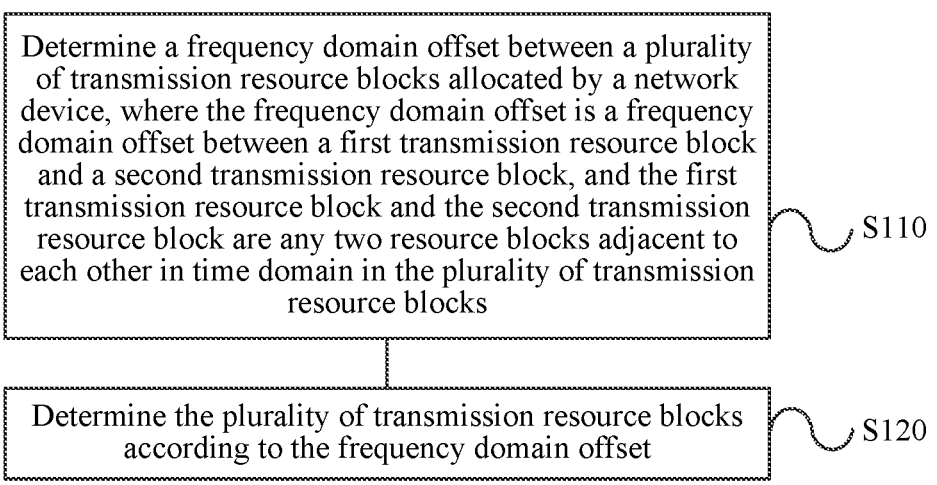
FIG. 1 is a schematic flowchart of a resource configuration method according to an embodiment of this application.

FIG. 1 is a schematic flowchart of a resource configuration method 100 according to an embodiment of this application. The method 100 may be performed by a terminal device. As shown in FIG. 1, the method 100 includes: S110: Determine a frequency domain offset between a plurality of transmission resource chunks allocated by a network device, where the frequency domain offset is a frequency domain offset between a first transmission resource chunk and a second transmission resource chunk, and the first transmission resource chunk and the second transmission resource chunk are any two resource chunks adjacent to each other in time domain in the plurality of transmission resource chunks. S120: Determine the plurality of transmission resource chunks according to the frequency domain offset.

Specifically, the network device configures the plurality of transmission resource chunks for the terminal device. The plurality of transmission resource chunks may be used by the terminal device to transmit a PUSCH, and each transmission resource chunk may occupy different time domain and frequency domain resources. The terminal device may determine the frequency domain offset between any two of the plurality of transmission resource chunks by using preconfiguration or receiving the frequency domain offset sent by the network device. This embodiment of this application is not limited thereto.

Optionally, in an embodiment, the terminal device may determine the frequency domain offset by using preconfiguration, for example, the terminal device configures a fixed threshold as the frequency domain offset.

Optionally, in an embodiment, the terminal device may further receive a first configuration message sent by the network device, where the first configuration message is used to indicate the frequency domain offset, and the first configuration message may be at least one of a network broadcast message, a network system message, an RRC message, a MAC CE, and DCI. For example, the terminal device receives an RRC message sent by the network device, where the RRC message may include the frequency domain offset. For another example, the terminal device receives an RRC message and a MAC CE sent by the network device, and determines, by using the RRC message and the MAC CE, the frequency domain offset configured by the network device.

In this embodiment of this application, time domain resource sizes occupied by the plurality of transmission resource chunks allocated by the network device to the terminal device may be the same or different, and a time domain size occupied by each of the plurality of transmission resource chunks is not limited herein. Herein, any two transmission resource chunks adjacent to each other in time domain in the plurality of transmission resource chunks is used as an example, a time domain size that may be occupied by each of the plurality of transmission resource chunks is described with reference to FIG. 2 to FIG. 4, and the occupied frequency domain size may be any size. The any two transmission resource chunks adjacent to each other in time domain are a first transmission resource chunk and a second transmission resource chunk.

It should be understood that adjacent means that the first transmission resource chunk and the second transmission resource chunk are adjacent to each other in time domain when the plurality of transmission resource chunks of the terminal device are sorted according to a time order, but the two transmission resource chunks may be continuous or discontinuous in time domain. For example, the first transmission resource chunk may be an (odd number)th transmission resource chunk of the plurality of transmission resource chunks when the plurality of transmission resource chunks is sorted in a time order, but the second transmission resource chunk is an (even number)th transmission resource chunk after the first transmission resource chunk.

Figure 2:
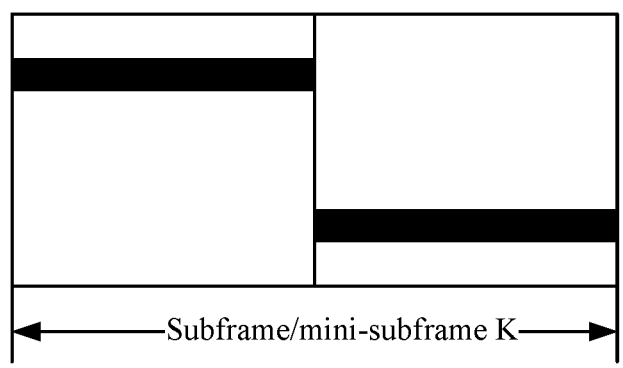
FIG. 2 is a schematic diagram of time domain sizes occupied by a first transmission resource chunk and a second transmission resource chunk according to an embodiment of this application.

Optionally, in an embodiment, the first transmission resource chunk and the second transmission resource chunk may separately occupy two parts in a subframe, or may separately occupy two parts in a mini-subframe. For example, as shown in FIG. 2, the first transmission resource chunk occupies a first part of a subframe K. The first part is the left part in FIG. 2, that is, the left black part in FIG. 2 is the first transmission resource chunk. The second transmission resource chunk occupies a second part of the subframe K. The second part is the right part in FIG. 2, that is, the right black part in FIG. 2 is the second transmission resource chunk. Alternatively, as shown in FIG. 2, the subframe K may also be a mini-subframe K. That is, the first transmission resource chunk occupies a first part of the mini-subframe K, and the second transmission resource chunk occupies a second part of the mini-subframe K.

It should be understood that, the first part and the second part may be equal in time domain, for example, a subframe or a mini-subframe may be equally divided by the first part and the second part; or the first part and the second part may be unequal. This embodiment of this application is not limited thereto.

Figure 3:
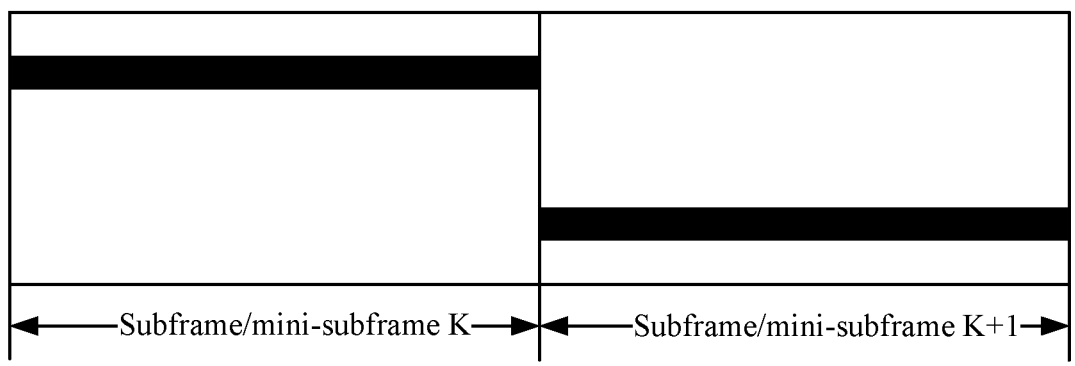
FIG. 3 is a schematic diagram of time domain sizes occupied by a first transmission resource chunk and a second transmission resource chunk according to another embodiment of this application.

Optionally, in an embodiment, the first transmission resource chunk and the second transmission resource chunk may separately occupy a subframe, or may separately occupy a mini-subframe, where the subframe or the mini-subframe is continuous. For example, as shown in FIG. 3, the first transmission resource chunk occupies a left subframe K in FIG. 3, and the second transmission resource chunk occupies a right subframe K+1 in FIG. 3; or the first transmission resource chunk occupies the left mini-subframe K in FIG. 3, and the second transmission resource chunk occupies the right mini-subframe K+1 in FIG. 3. The subframe or the mini-subframe occupied by the first transmission resource chunk and the second transmission resource chunk is continuous.

Figure 4:
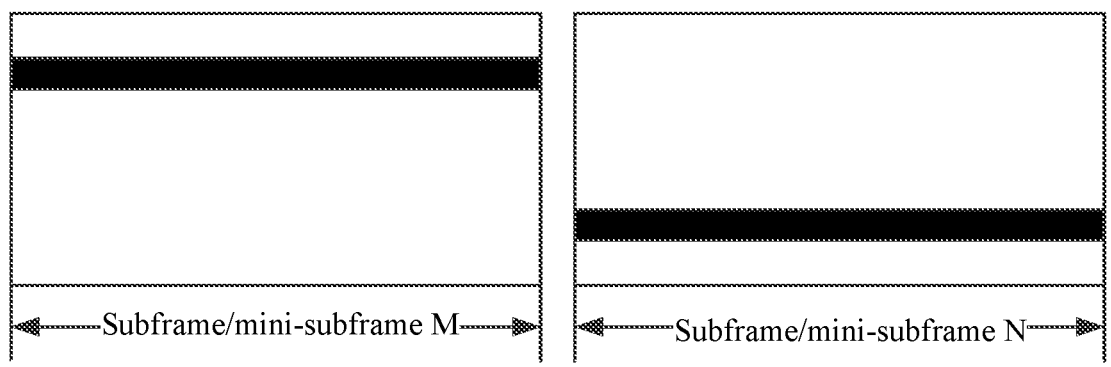
FIG. 4 is a schematic diagram of time domain sizes occupied by a first transmission resource chunk and a second transmission resource chunk according to still another embodiment of this application.

Optionally, in an embodiment, the first transmission resource chunk and the second transmission resource chunk may separately occupy a subframe, or may separately occupy a mini-subframe, where the subframe or the mini-subframe is discontinuous. For example, as shown in FIG. 4, the first transmission resource chunk occupies a left subframe M in FIG. 4, and the second transmission resource chunk occupies a right subframe N in FIG. 4; or the first transmission resource chunk occupies the left mini-subframe M in FIG. 4, and the second transmission resource chunk occupies the right mini-subframe N in FIG. 4. The subframe or the mini-subframe occupied by the first transmission resource chunk and the second transmission resource chunk is discontinuous, that is, a difference between M and N is greater than 1. Optionally, another subframe between the subframe M and the subframe N, or another mini-subframe between the mini-subframe M and the mini-subframe N may be a transmission resource allocated by the network device to another terminal device. This embodiment of this application is not limited thereto.

It should be understood that the subframe may be 1 ms and may include 14 orthogonal frequency division multiplexing (OFDM) symbols. Correspondingly, the mini-subframe is less than the subframe, and the mini-subframe may include less than 14 OFDM symbols.

For ease of description, a time domain size and a frequency domain size occupied by the first transmission resource chunk and the second transmission resource chunk described below are not limited. That the first transmission resource chunk is before the second transmission resource chunk in time domain is used as an example for description.

In this embodiment of this application, the terminal device may determine a frequency domain resource location occupied by the first transmission resource chunk, for example, may determine a frequency domain location of the first transmission resource chunk according to configuration of the network device, determine the frequency domain offset between the first transmission resource chunk and the second transmission resource chunk, and determine, according to the frequency domain offset, a frequency domain resource location occupied by the second transmission resource chunk.

Figure 5:
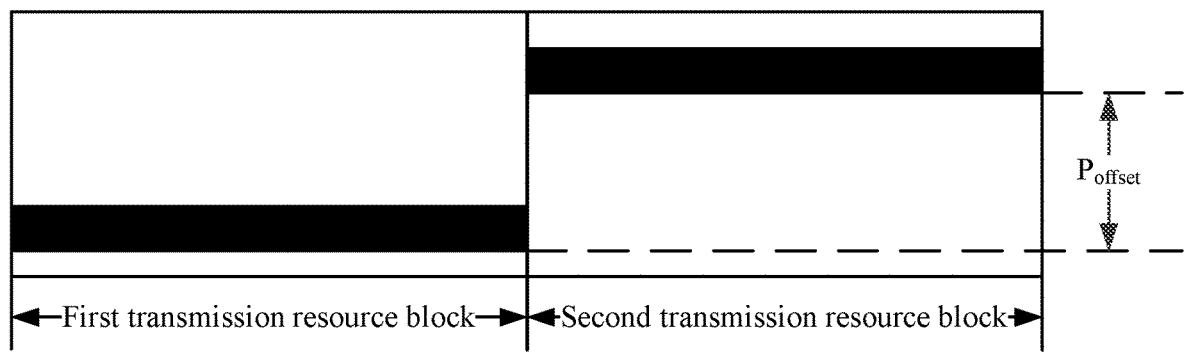
FIG. 5 is a schematic diagram of a time domain offset according to an embodiment of this application.

It should be understood that as shown in FIG. 5, a left black chunk indicates the first transmission resource chunk, a right black chunk indicates the second transmission resource chunk, and the frequency domain offset (Poffset) may indicate a difference between the start location occupied by the first transmission resource chunk in frequency domain and the start location occupied by the second transmission resource chunk in frequency domain. The terminal device may determine, according to a sum of the start location occupied by the first transmission resource chunk in frequency domain and the frequency domain offset, the start location occupied by the second transmission resource chunk in frequency domain. Optionally, the frequency domain offset may further indicate the frequency domain offset between the first transmission resource chunk and the second transmission resource chunk in another manner.

For example, the frequency domain offset may further indicate a difference between an end location occupied by the first transmission resource chunk in frequency domain and the start location occupied by the second transmission resource chunk in frequency domain. The terminal device may determine, according to a sum of the end location occupied by the first transmission resource chunk in frequency domain and the frequency domain offset, the start location occupied by the second transmission resource chunk in frequency domain.

For another example, the frequency domain offset may further indicate a difference between a center location of a frequency domain resource occupied by the first transmission resource chunk and a center location of a frequency domain resource occupied by the second transmission resource chunk. The terminal device may determine, according to a sum of the center location of the frequency domain resource occupied by the first transmission resource chunk and the frequency domain offset, the center location of the frequency domain resource occupied by the second transmission resource chunk, and may determine, according to a size of the second transmission resource chunk, a start location of the frequency domain resource occupied by the second transmission resource chunk.

In this embodiment of this application, the terminal device may further determine a resource area parameter, where the resource area parameter is used to indicate a frequency domain range that can be occupied by at least one transmission resource chunk of the plurality of transmission resource chunks allocated by the network device to the terminal device. Optionally, the frequency domain range that can be occupied by the at least one transmission resource chunk and that is indicated by the resource area parameter may be continuous or discontinuous, for example, may be a plurality of discrete areas.

It should be understood that the resource area parameter indicates the frequency domain range that can be occupied by the at least one transmission resource chunk, the at least one transmission resource chunk may be some or all of the plurality of transmission resource chunks, and the at least one transmission resource chunk includes at least the second transmission resource chunk. Specifically, the terminal device may determine, according to preconfiguration or semi-static or dynamic configuration of the network device, the frequency domain location occupied by the first transmission resource chunk, and then determine the location of the second transmission resource chunk according to the frequency domain location occupied by the first transmission resource chunk and the frequency domain offset. Herein, that the resource area parameter indicates the frequency domain range that can be occupied by the second transmission resource chunk is used as an example for description.

Optionally, in an embodiment, the frequency domain range that can be occupied by the at least one transmission resource chunk and that is indicated by the resource area parameter may be continuous, that is, the frequency domain range that can be occupied by the second transmission resource chunk is continuous. For example, as shown in FIG. 6, the terminal device determines, according to the resource area parameter, that the frequency domain range that can be occupied by the second transmission resource chunk is a frequency domain range other than an edge slash shadow area on the right side, and the terminal device determines the second transmission resource chunk in the area according to the first transmission resource chunk and the frequency domain offset.

Figure 6:
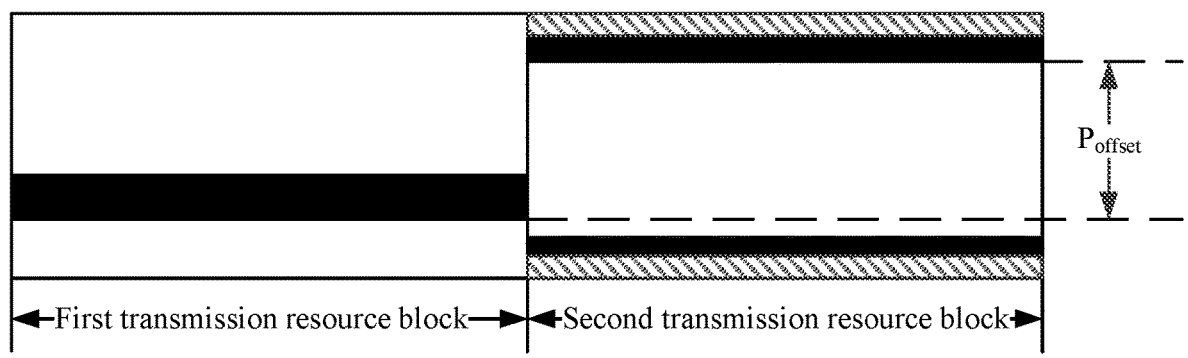
FIG. 6 is a schematic diagram of a time domain resource that can be occupied by at least one transmission resource chunk according to an embodiment of this application.

As shown in FIG. 6, an edge location indicated by the slash shadow area on the right side is not used to transmit a PUSCH, but may be used to transmit another signal, for example, a physical uplink control channel (PUCCH).

Optionally, if it is determined, according to the first transmission resource chunk and the frequency domain offset, that the range of the second transmission resource chunk exceeds the range indicated by the resource area parameter, as shown in FIG. 6, a part not exceeding the range indicated by the resource area parameter and a part exceeding the range indicated by the resource area parameter may be separated. The part exceeding the range indicated by the resource area parameter is placed on another side for transmission by using a method of cycling in the range indicated by the resource area parameter.

Figure 7:
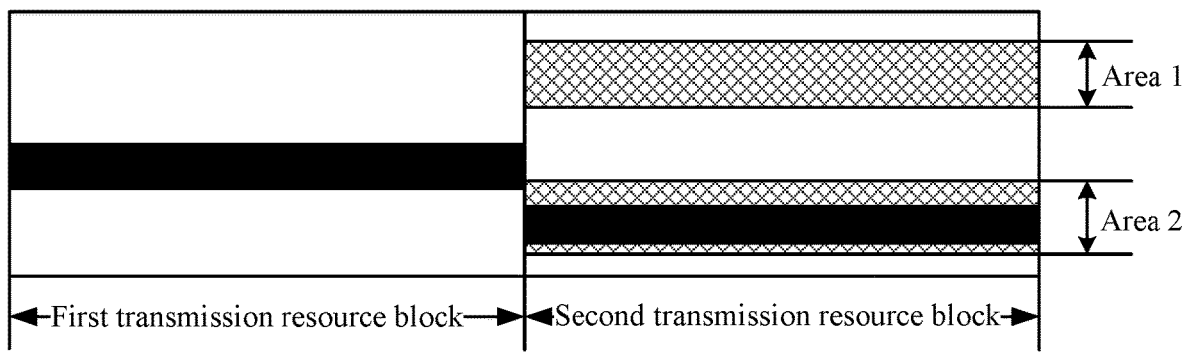
FIG. 7 is a schematic diagram of a time domain resource that can be occupied by at least one transmission resource chunk according to another embodiment of this application.

Optionally, in an embodiment, the frequency domain range that can be occupied by the at least one transmission resource chunk and that is indicated by the resource area parameter may be discontinuous, that is, the frequency domain range that can be occupied by the second transmission resource chunk is discontinuous. For example, the area indicated by the resource area parameter may be a plurality of discontinuous areas. As shown in FIG. 7, the area indicated by the resource area parameter may include two areas, that is, an area 1 and an area 2 indicated by cross-connected-line shadow areas in FIG. 7, and the second transmission resource chunk belongs to the area 1 and the area 2.

Specifically, the terminal device determines the second transmission resource chunk in the area 1 and the area 2 according to the first transmission resource chunk and the frequency domain offset, where the frequency domain offset may not include a part other than the area 1 and the area 2. Similarly, when it is determined, according to the first transmission resource chunk and the frequency domain offset, that the start location of the second transmission resource chunk is close to an edge of the area 1 or the area 2, and the second transmission resource chunk has a part exceeding the area 1 or the area 2, the part exceeding the area 1 or the area 2 and a part not exceeding the area 1 or the area 2 in the second transmission resource chunk may also be separated, and cycle in the area 1 and/or the area 2. For example, it is determined that the start location of the second transmission resource chunk is close to the edge of the area 2, and the second transmission resource chunk has a part exceeding the area 2. The second transmission resource chunk may be separated for transmission. The part exceeding the area 2 may continue to be transmitted in a cycling manner in the area 2, or may be transmitted in a cycling manner in all available areas, that is, cycles in the area 1 and the area 2, and the part exceeding the area 2 in the second transmission resource chunk is mapped to the area 1. This embodiment of this application is not limited thereto.

In this embodiment of this application, the terminal device determines that the resource area parameter may be preconfigured. Optionally, the terminal device may further receive a second configuration message sent by the network device, where the second configuration message is used to indicate the resource area parameter, and the second configuration message is at least one of a network broadcast message, a network system message, an RRC message, a MAC CE, and DCI. For example, the terminal device receives an RRC message sent by the network device, where the RRC message may include the resource area parameter. For another example, the terminal device receives an RRC message and a MAC CE sent by the network device, and determines, by using the RRC message and the MAC CE, the resource area parameter configured by the network device.

Therefore, according to the resource configuration method in this embodiment of this application, the terminal device determines a frequency domain offset between any two neighboring transmission resource chunks of the plurality of transmission resource chunks allocated by the network device, and may further determine the frequency domain range that can be occupied by at least one transmission resource chunk of the plurality of transmission resource chunks, and determines the frequency domain location of the plurality of transmission resource chunks according to the frequency domain offset and the frequency domain range that can be occupied. In this configuration manner, scheduling of the network device is simple, the terminal device may obtain a frequency domain diversity gain, and transmission resource fragmentation is avoided.

The foregoing describes the resource configuration method according to the embodiments of this application in detail with reference to FIG. 1 to FIG. 7 from the perspective of the terminal device, and the following describes the resource configuration method according to the embodiments of this application with reference to FIG. 8 from the perspective of a network device.

FIG. 8 is a schematic flowchart of a resource configuration method 200 according to another embodiment of this application. The method 200 may be performed by a network device. As shown in FIG. 8, the method 200 includes:

S210: Determine a frequency domain offset between a plurality of transmission resource chunks allocated to a terminal device, where the frequency domain offset is a frequency domain offset between a first transmission resource chunk and a second transmission resource chunk, and the first transmission resource chunk and the second transmission resource chunk are any two resource chunks adjacent to each other in time domain in the plurality of transmission resource chunks. S220: Send the frequency domain offset to the terminal device.

Optionally, the first transmission resource chunk is an (odd number)th transmission resource chunk when the plurality of transmission resource chunks is sorted in a time order, and the second transmission resource chunk is located after the first transmission resource chunk in time domain.

Optionally, the frequency domain offset is a difference between a start location of the first transmission resource chunk in frequency domain and a start location of the second transmission resource chunk in frequency domain.

Optionally, the first transmission resource chunk and the second transmission resource chunk separately occupy a subframe or a mini-subframe; or optionally, the first transmission resource chunk occupies a first part of a subframe and the second transmission resource chunk occupies a second part of the subframe; or Optionally, the first transmission resource chunk occupies a first part of a mini-subframe and the second transmission resource chunk occupies a second part of the mini-subframe.

Optionally, the sending the frequency domain offset to the terminal device includes: sending a first configuration message to the terminal device, where the first configuration message is used to indicate the frequency domain offset, and the first configuration message is at least one of a network broadcast message, a network system message, an RRC message, a MAC CE, and DCI.

Optionally, the method further includes: sending a resource area parameter to the terminal device, where the resource area parameter is used to indicate a frequency domain range that can be occupied by at least one transmission resource chunk of the plurality of transmission resource chunks, and the at least one transmission resource chunk includes the first transmission resource chunk or the second transmission resource chunk.

Optionally, the sending the resource area parameter to the terminal device includes: sending second a configuration message to the terminal device, where the second configuration message is used to indicate the resource area parameter, and the second configuration message is at least one of a network broadcast message, a network system message, an RRC message, a MAC CE, and DCI.

Optionally, the frequency domain range that can be occupied by the at least one transmission resource chunk and that is indicated by the resource area parameter is discontinuous.

It should be understood that the network device in the method 200 in this embodiment of this application may correspond to the network device in the method 100, and the terminal device in the method 200 may correspond to the terminal device in the method 100. Details are not provided herein again.

Therefore, according to the resource configuration method in this embodiment of this application, the network device configures the plurality of transmission resource chunks for uplink transmission of the terminal device, sends the frequency domain offset between any two neighboring transmission resource chunks of the plurality of transmission resource chunks to the terminal device, and may further configure a frequency domain range that can be occupied by at least one transmission resource chunk of the plurality of transmission resource chunks for the terminal device, so that the terminal device can determine the frequency domain location of the plurality of transmission resource chunks according to the frequency domain offset and the frequency domain range that can be occupied. Therefore, a configuration manner of the network device is simple, the terminal device may obtain a frequency domain diversity gain, and transmission resource fragmentation is avoided.

Figure 9:
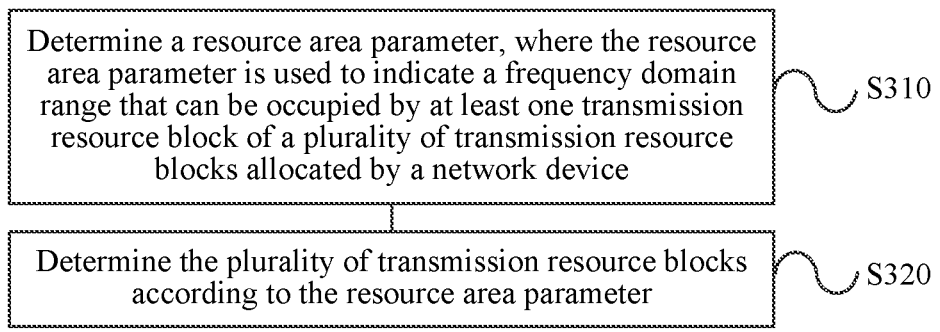
FIG. 9 is a schematic flowchart of a resource configuration method according to still another embodiment of this application.

FIG. 9 is a schematic flowchart of a resource configuration method 300 according to still another embodiment of this application. The method 300 may be performed by a terminal device. As shown in FIG. 9, the method 300 includes: S310: Determine a resource area parameter, where the resource area parameter is used to indicate a frequency domain range that can be occupied by at least one transmission resource chunk of a plurality of transmission resource chunks allocated by a network device. S320: Determine the plurality of transmission resource chunks according to the resource area parameter.

Specifically, the terminal device determines that the resource area parameter may be preconfigured. Alternatively, the terminal device may further receive a configuration message sent by the network device, where the configuration message is used to indicate the resource area parameter, and the configuration message is at least one of a network broadcast message, a network system message, an RRC message, a MAC CE, and DCI. For example, the terminal device receives an RRC message sent by the network device, where the RRC message may include the resource area parameter. For another example, the terminal device receives an RRC message and a MAC CE sent by the network device, and determines, by using the RRC message and the MAC CE, the resource area parameter configured by the network device.

In this embodiment of this application, the resource area parameter determined by the terminal device is used to indicate a frequency domain range that can be occupied by at least one transmission resource chunk of the plurality of transmission resource chunks allocated by the network device to the terminal device. The at least one transmission resource chunk may be some or all of the plurality of transmission resource chunks. Optionally, the frequency domain range that can be occupied by the at least one transmission resource chunk and that is indicated by the resource area parameter may be continuous or discontinuous, for example, may be a plurality of discrete areas.

Optionally, in an embodiment, the frequency domain range that can be occupied by the at least one transmission resource chunk and that is indicated by the resource area parameter may be continuous. For example, as shown in FIG. 6, the terminal device determines, according to the resource area parameter, that the frequency domain range that can be occupied by the at least one transmission resource chunk may be an entire frequency domain range other than an edge slash shadow area on the right side. As shown in FIG. 6, an edge location indicated by the slash shadow area on the right side is not used to transmit a PUSCH, but may be used to transmit another signal, for example, a PUCCH.

Optionally, in an embodiment, the frequency domain range that can be occupied by the at least one transmission resource chunk and that is indicated by the resource area parameter may be discontinuous. For example, the area indicated by the resource area parameter may be a plurality of discontinuous areas. As shown in FIG. 7, the area indicated by the resource area parameter may include two areas, that is, an area 1 and an area 2 indicated by a cross-connected-line shadow area in FIG. 7, that is, the at least one transmission resource chunk all belongs to the area 1 and the area 2.

In this embodiment of this application, the terminal device may determine, according to the resource area parameter, the frequency domain range that can be occupied by the at least one transmission resource chunk of the plurality of transmission resource chunks allocated by the network device. For example, the terminal device may perform uplink transmission in a frequency hopping manner, for example, transmit a PUSCH. The at least one transmission resource chunk includes at least a transmission resource chunk that needs to be transmitted in a frequency hopping manner.

Specifically, the terminal device may perform frequency hopping transmission in a manner in the prior art. For example, for any two neighboring transmission resource chunks of the plurality of transmission resource chunks configured by the network device, after a frequency domain location of a previous transmission resource chunk is fixed, a frequency domain location of a next transmission resource chunk may be determined according to a frequency hopping function. The next transmission resource chunk belongs to the at least one transmission resource chunk, that is, the frequency domain location occupied by the next transmission resource chunk belongs to the frequency domain range that can be occupied by the at least one transmission resource chunk and that is indicated by the resource area parameter.

Optionally, the terminal device may further determine the frequency domain offset between any two neighboring transmission resource chunks in the manner of the method 100 and the method 200, to perform frequency hopping transmission. Details are not provided herein. It should be understood that the terminal device determines the frequency domain range that can be occupied and that is indicated by the resource area parameter, and the terminal device determines the plurality of transmission resource chunks in the range, and performs uplink transmission by using the plurality of transmission resource chunks, for example, transmits a PUSCH.

Therefore, according to the resource configuration method in this embodiment of this application, the terminal device determines the resource area parameter, where the resource area parameter is used to indicate the frequency domain range that can be occupied by at least one transmission resource chunk of the plurality of transmission resource chunks allocated by the network device, and determines the plurality of transmission resource chunks in the range indicated by the resource area parameter, so that the terminal device may perform uplink transmission by using the plurality of transmission resource chunks, to improve transmission efficiency.

Figure 10:
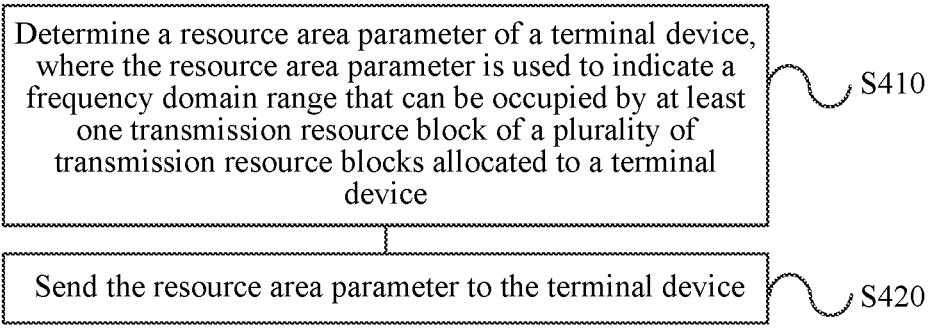
FIG. 10 is a schematic flowchart of a resource configuration method according to still another embodiment of this application.

The foregoing describes the resource configuration method according to the embodiments of this application in detail with reference to FIG. 9 from the perspective of the terminal device, and the following describes the resource configuration method according to the embodiments of this application with reference to FIG. 10 from the perspective of a network device.

FIG. 10 is a schematic flowchart of a resource configuration method 400 according to still another embodiment of this application. The method 400 may be performed by a network device. As shown in FIG. 10, the method 400 includes: S410: Determine a resource area parameter of a terminal device, where the resource area parameter is used to indicate a frequency domain range that can be occupied by at least one transmission resource chunk of a plurality of transmission resource chunks allocated to the terminal device. S420: Send the resource area parameter to the terminal device.

Optionally, the sending the resource area parameter to the terminal device includes: sending a configuration message to the terminal device, where the configuration message is used to indicate the resource area parameter, and the configuration message is at least one of a network broadcast message, a network system message, an RRC message, a MAC CE, and DCI.

Optionally, the frequency domain range that can be occupied by the at least one transmission resource chunk and that is indicated by the resource area parameter is discontinuous.

It should be understood that the network device in the method 400 in this embodiment of this application may correspond to the network device in the method 300, and the terminal device in the method 400 may correspond to the terminal device in the method 300. Details are not provided herein again.

Therefore, according to the resource configuration method in this embodiment of this application, the network device configures the plurality of transmission resource chunks for the terminal device, and sends, to the terminal device, the resource area parameter used to indicate the frequency domain range that can be occupied by at least one transmission resource chunk of the plurality of transmission resource chunks, so that the terminal device can determine the plurality of transmission resource chunks in the range indicated by the resource area parameter, and perform uplink transmission by using the plurality of transmission resource chunks, to improve transmission efficiency.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

The foregoing describes the resource configuration method according to the embodiments of this application in detail with reference to FIG. 1 to FIG. 10, and the following describes the terminal device and the network device according to the embodiments of this application with reference to FIG. 11 to FIG. 18.

Figure 11:
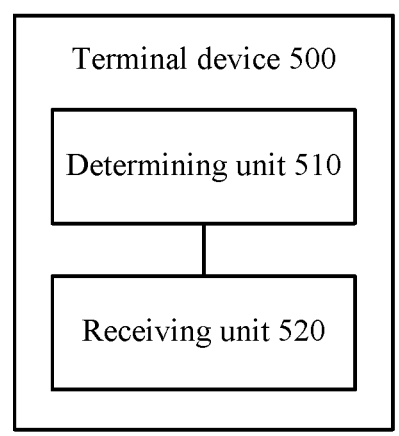
FIG. 11 is a schematic chunk diagram of a terminal device according to an embodiment of this application.

As shown in FIG. 11, a terminal device 500 according to an embodiment of this application includes: a determining unit 510, and optionally, may further include a receiving unit 520.

Specifically, the determining unit 510 is configured to determine a frequency domain offset between a plurality of transmission resource chunks allocated by a network device, where the frequency domain offset is a frequency domain offset between a first transmission resource chunk and a second transmission resource chunk, and the first transmission resource chunk and the second transmission resource chunk are any two resource chunks adjacent to each other in time domain in the plurality of transmission resource chunks; and the determining unit 510 is further configured to determine the plurality of transmission resource chunks according to the frequency domain offset.

Optionally, the first transmission resource chunk is an (odd number)th transmission resource chunk when the plurality of transmission resource chunks is sorted in a time order, and the second transmission resource chunk is located after the first transmission resource chunk in time domain.

Optionally, the frequency domain offset is a difference between a start location of the first transmission resource chunk in frequency domain and a start location of the second transmission resource chunk in frequency domain.

Optionally, the first transmission resource chunk and the second transmission resource chunk separately occupy a subframe or a mini-subframe; or the first transmission resource chunk occupies a first part of a subframe and the second transmission resource chunk occupies a second part of the subframe; or the first transmission resource chunk occupies a first part of a mini-subframe and the second transmission resource chunk occupies a second part of the mini-subframe.

Optionally, the receiving unit 520 is configured to receive the frequency domain offset sent by the network device.

Optionally, the receiving unit 520 is specifically configured to receive a first configuration message sent by the network device, where the first configuration message is used to indicate the frequency domain offset, and the first configuration message is at least one of a network broadcast message, a network system message, an RRC message, a MAC CE, and DCI.

Optionally, the determining unit 510 is further configured to determine a resource area parameter, where the resource area parameter is used to indicate a frequency domain range that can be occupied by at least one transmission resource chunk of the plurality of transmission resource chunks, and the at least one transmission resource chunk includes the first transmission resource chunk or the second transmission resource chunk.

Optionally, the receiving unit 520 is configured to receive the resource area parameter sent by the terminal device.

Optionally, the receiving unit 520 is specifically configured to receive a second configuration message sent by the network device, where the second configuration message is used to indicate the resource area parameter, and the second configuration message is at least one of a network broadcast message, a network system message, an RRC message, a MAC CE, and DCI.

Optionally, the frequency domain range that can be occupied by the at least one transmission resource chunk and that is indicated by the resource area parameter is discontinuous.

It should be understood that the terminal device 500 according to this embodiment of this application may correspondingly perform the method 100 in the embodiments of this application. The foregoing and other operations and/or functions of the units of the terminal device 500 are separately used to implement the corresponding procedures of the terminal device in the methods in FIG. 1 to FIG. 8. For the purpose of conciseness, details are not described herein again.

Therefore, the terminal device in this embodiment of this application determines a frequency domain offset between any two neighboring transmission resource chunks of the plurality of transmission resource chunks allocated by the network device, and may further determine the frequency domain range that can be occupied by at least one transmission resource chunk of the plurality of transmission resource chunks, and determines the frequency domain location of the plurality of transmission resource chunks according to the frequency domain offset and the frequency domain range that can be occupied. In this configuration manner, scheduling of the network device is simple, the terminal device may obtain a frequency domain diversity gain, and transmission resource fragmentation is avoided.

Figure 12:
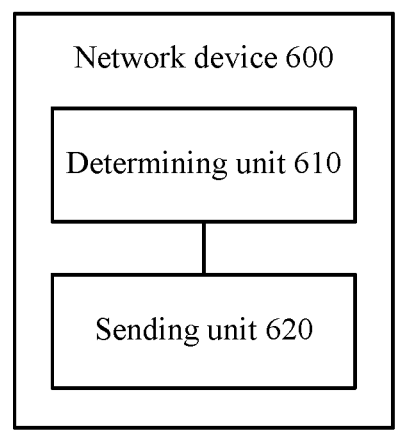
FIG. 12 is a schematic chunk diagram of a network device according to an embodiment of this application.

As shown in FIG. 12, a network device 600 according to an embodiment of this application includes: a determining unit 610 and a sending unit 620.

Specifically, the determining unit 610 is configured to determine a frequency domain offset between a plurality of transmission resource chunks allocated to a terminal device, where the frequency domain offset is a frequency domain offset between a first transmission resource chunk and a second transmission resource chunk, and the first transmission resource chunk and the second transmission resource chunk are any two resource chunks adjacent to each other in time domain in the plurality of transmission resource chunks; and the sending unit 620 is configured to send the frequency domain offset to the terminal device.

Optionally, the first transmission resource chunk is an (odd number)th transmission resource chunk when the plurality of transmission resource chunks is sorted in a time order, and the second transmission resource chunk is located after the first transmission resource chunk in time domain.

Optionally, the frequency domain offset is a difference between a start location of the first transmission resource chunk in frequency domain and a start location of the second transmission resource chunk in frequency domain.

Optionally, the first transmission resource chunk and the second transmission resource chunk separately occupy a subframe or a mini-subframe; or the first transmission resource chunk occupies a first part of a subframe and the second transmission resource chunk occupies a second part of the subframe; or the first transmission resource chunk occupies a first part of a mini-subframe and the second transmission resource chunk occupies a second part of the mini-subframe.

Optionally, the sending unit 620 is specifically configured to send a first configuration message to the terminal device, where the first configuration message is used to indicate the frequency domain offset, and the first configuration message is at least one of a network broadcast message, a network system message, an RRC message, a MAC CE, and DCI.

Optionally, the sending unit 620 is further configured to send a resource area parameter to the terminal device, where the resource area parameter is used to indicate a frequency domain range that can be occupied by at least one transmission resource chunk of the plurality of transmission resource chunks, and the at least one transmission resource chunk includes the first transmission resource chunk or the second transmission resource chunk.

Optionally, the sending unit 620 is specifically configured to send a second configuration message to the terminal device, where the second configuration message is used to indicate the resource area parameter, and the second configuration message is at least one of a network broadcast message, a network system message, an RRC message, a MAC CE, and DCI.

Optionally, the frequency domain range that can be occupied by the at least one transmission resource chunk and that is indicated by the resource area parameter is discontinuous.

It should be understood that the network device 600 according to this embodiment of this application may correspondingly perform the method 200 in the embodiments of this application. The foregoing and other operations and/or functions of the units of the network device 600 are separately used to implement the corresponding procedures of the network device in the methods in FIG. 1 to FIG. 8. For the purpose of conciseness, details are not described herein again.

Therefore, the network device in this embodiment of this application configures the plurality of transmission resource chunks for uplink transmission of the terminal device, sends the frequency domain offset between any two neighboring transmission resource chunks of the plurality of transmission resource chunks to the terminal device, and may further configure a frequency domain range that can be occupied by at least one transmission resource chunk of the plurality of transmission resource chunks for the terminal device, so that the terminal device can determine the frequency domain location of the plurality of transmission resource chunks according to the frequency domain offset and the frequency domain range that can be occupied.

Therefore, a configuration manner of the network device is simple, the terminal device may obtain a frequency domain diversity gain, and transmission resource fragmentation is avoided.

Figure 13:
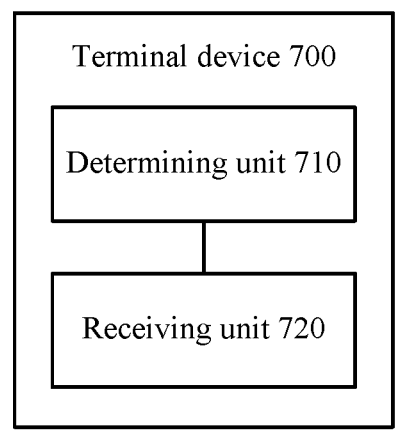
FIG. 13 is a schematic chunk diagram of a terminal device according to another embodiment of this application.

As shown in FIG. 13, a terminal device 700 according to an embodiment of this application includes: a determining unit 710, and optionally, may further include a receiving unit 720.

Specifically, the determining unit 710 is configured to determine a resource area parameter, where the resource area parameter is used to indicate a frequency domain range that can be occupied by at least one transmission resource chunk of a plurality of transmission resource chunks allocated by a network device; and the determining unit 710 is further configured to determine the plurality of transmission resource chunks according to the resource area parameter.

Optionally, the receiving unit 720 is configured to receive the resource area parameter sent by the terminal device.

Optionally, the receiving unit 720 is specifically configured to receive a configuration message sent by the network device, where the configuration message is used to indicate the resource area parameter, and the configuration message is at least one of a network broadcast message, a network system message, an RRC message, a MAC CE, and DCI.

Optionally, the frequency domain range that can be occupied by the at least one transmission resource chunk and that is indicated by the resource area parameter is discontinuous.

It should be understood that the terminal device 700 according to this embodiment of this application may correspondingly perform the method 300 in the embodiments of this application. The foregoing and other operations and/or functions of the units of the terminal device 700 are separately used to implement the corresponding procedures of the terminal device in the methods in FIG. 9 and FIG. 10. For the purpose of conciseness, details are not described herein again.

Therefore, the terminal device in this embodiment of this application determines the resource area parameter, where the resource area parameter is used to indicate the frequency domain range that can be occupied by at least one transmission resource chunk of the plurality of transmission resource chunks allocated by the network device, and determines the plurality of transmission resource chunks in the range indicated by the resource area parameter, so that the terminal device may perform uplink transmission by using the plurality of transmission resource chunks, to improve transmission efficiency.

Figure 14:
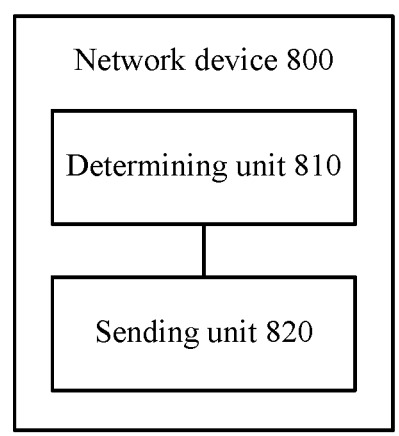
FIG. 14 is a schematic chunk diagram of a network device according to another embodiment of this application.

As shown in FIG. 14, a network device 800 according to this embodiment of this application includes: a determining unit 810 and a sending unit 820.

Specifically, the determining unit 810 is configured to determine a resource area parameter of a terminal device, where the resource area parameter is used to indicate a frequency domain range that can be occupied by at least one transmission resource chunk of a plurality of transmission resource chunks allocated to the terminal device; and the sending unit 820 is configured to send the resource area parameter to the terminal device.

Optionally, the sending unit 820 is specifically configured to send a configuration message to the terminal device, where the configuration message is used to indicate the resource area parameter, and the configuration message is at least one of a network broadcast message, a network system message, an RRC message, a MAC CE, and DCI.

Optionally, the frequency domain range that can be occupied by the at least one transmission resource chunk and that is indicated by the resource area parameter is discontinuous.

It should be understood that the network device 800 according to this embodiment of this application may correspondingly perform the method 400 in the embodiments of this application. The foregoing and other operations and/or functions of the units of the network device 800 are separately used to implement the corresponding procedures of the network device in the methods in FIG. 9 and FIG. 10. For the purpose of conciseness, details are not described herein again.

Therefore, the network device in this embodiment of this application configures the plurality of transmission resource chunks for the terminal device, and sends, to the terminal device, the resource area parameter used to indicate the frequency domain range that can be occupied by at least one transmission resource chunk of the plurality of transmission resource chunks, so that the terminal device can determine the plurality of transmission resource chunks in the range indicated by the resource area parameter, and perform uplink transmission by using the plurality of transmission resource chunks, to improve transmission efficiency.

Figure 15:
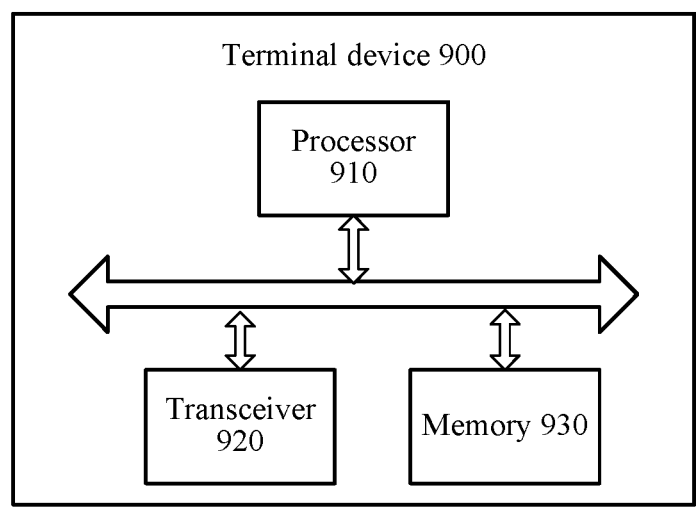
FIG. 15 is a schematic chunk diagram of a terminal device according to still another embodiment of this application.

FIG. 15 is a schematic chunk diagram of a terminal device 900 according to an embodiment of this application. As shown in FIG. 15, the terminal device 900 includes: a processor 910 and a transceiver 920, where the processor 910 and the transceiver 920 are connected. Optionally, the terminal device 900 further includes a memory 930, where the memory 930 and the processor 910 are connected. The processor 910, the memory 930, and the transceiver 920 communicate with each other and transfer and/or control a data signal through an internal connection path. The memory 930 may be configured to store an instruction, and the processor 910 is configured to execute the instruction stored by the memory 930, to control the transceiver 920 to send information or a signal. The processor 910 is configured to: determine a frequency domain offset between a plurality of transmission resource chunks allocated by a network device, where the frequency domain offset is a frequency domain offset between a first transmission resource chunk and a second transmission resource chunk, and the first transmission resource chunk and the second transmission resource chunk are any two resource chunks adjacent to each other in time domain in the plurality of transmission resource chunks; and determine the plurality of transmission resource chunks according to the frequency domain offset.

Optionally, the first transmission resource chunk is an (odd number)th transmission resource chunk when the plurality of transmission resource chunks is sorted in a time order, and the second transmission resource chunk is located after the first transmission resource chunk in time domain.

Optionally, the frequency domain offset is a difference between a start location of the first transmission resource chunk in frequency domain and a start location of the second transmission resource chunk in frequency domain.

Optionally, the first transmission resource chunk and the second transmission resource chunk separately occupy a subframe or a mini-subframe; or the first transmission resource chunk occupies a first part of a subframe and the second transmission resource chunk occupies a second part of the subframe; or the first transmission resource chunk occupies a first part of a mini-subframe and the second transmission resource chunk occupies a second part of the mini-subframe.

Optionally, the transceiver 920 is configured to receive the frequency domain offset sent by the network device.

Optionally, the transceiver 920 is configured to receive a first configuration message sent by the network device, where the first configuration message is used to indicate the frequency domain offset, and the first configuration message is at least one of a network broadcast message, a network system message, an RRC message, a MAC CE, and DCI.

Optionally, the processor 910 is configured to determine a resource area parameter, where the resource area parameter is used to indicate a frequency domain range that can be occupied by at least one transmission resource chunk of the plurality of transmission resource chunks, and the at least one transmission resource chunk includes the first transmission resource chunk or the second transmission resource chunk.

Optionally, the transceiver 920 is configured to receive the resource area parameter sent by the terminal device.

Optionally, the transceiver 920 is configured to receive a second configuration message sent by the network device, where the second configuration message is used to indicate the resource area parameter, and the second configuration message is at least one of a network broadcast message, a network system message, an RRC message, a MAC CE, and DCI.

Optionally, the frequency domain range that can be occupied by the at least one transmission resource chunk and that is indicated by the resource area parameter is discontinuous.

It should be understood that the terminal device 900 according to this embodiment of this application may correspond to the terminal device 500 in the embodiments of this application, and may correspond to a corresponding entity for performing the method 100 in the embodiments of this application. The foregoing and other operations and/or functions of the units of the terminal device 900 are separately used to implement the corresponding procedures of the terminal device in the methods in FIG. 1 to FIG. 8. For the purpose of conciseness, details are not described herein again.

Therefore, the terminal device in this embodiment of this application determines a frequency domain offset between any two neighboring transmission resource chunks of the plurality of transmission resource chunks allocated by the network device, and may further determine the frequency domain range that can be occupied by at least one transmission resource chunk of the plurality of transmission resource chunks, and determines the frequency domain location of the plurality of transmission resource chunks according to the frequency domain offset and the frequency domain range that can be occupied. In this configuration manner, scheduling of the network device is simple, the terminal device may obtain a frequency domain diversity gain, and transmission resource fragmentation is avoided.

Figure 16:
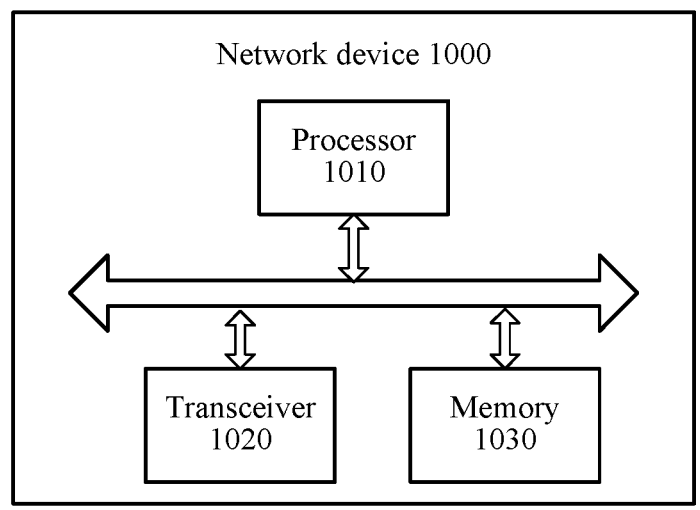
FIG. 16 is a schematic chunk diagram of a network device according to still another embodiment of this application.

FIG. 16 is a schematic chunk diagram of a network device 1000 according to an embodiment of this application. As shown in FIG. 16, the network device 1000 includes: a processor 1010 and a transceiver 1020, where the processor 1010 and the transceiver 1020 are connected. Optionally, the network device 1000 further includes a memory 1030, where the memory 1030 and the processor 1010 are connected. The processor 1010, the memory 1030, and the transceiver 1020 communicate with each other and transfer and/or control a data signal through an internal connection path. The memory 1030 may be configured to store an instruction, and the processor 1010 is configured to execute the instruction stored by the memory 1030, to control the transceiver 1020 to send information or a signal. The processor 1010 is configured to determine a frequency domain offset between a plurality of transmission resource chunks allocated to a terminal device, where the frequency domain offset is a frequency domain offset between a first transmission resource chunk and a second transmission resource chunk, and the first transmission resource chunk and the second transmission resource chunk are any two resource chunks adjacent to each other in time domain in the plurality of transmission resource chunks; and the transceiver 1020 is configured to send the frequency domain offset to the terminal device.

Optionally, the first transmission resource chunk is an (odd number)th transmission resource chunk when the plurality of transmission resource chunks is sorted in a time order, and the second transmission resource chunk is located after the first transmission resource chunk in time domain.

Optionally, the frequency domain offset is a difference between a start location of the first transmission resource chunk in frequency domain and a start location of the second transmission resource chunk in frequency domain.

Optionally, the first transmission resource chunk and the second transmission resource chunk separately occupy a subframe or a mini-subframe; or the first transmission resource chunk occupies a first part of a subframe and the second transmission resource chunk occupies a second part of the subframe; or the first transmission resource chunk occupies a first part of a mini-subframe and the second transmission resource chunk occupies a second part of the mini-subframe.

Optionally, the transceiver 1020 is configured to send a first configuration message to the terminal device, where the first configuration message is used to indicate the frequency domain offset, and the first configuration message is at least one of a network broadcast message, a network system message, an RRC message, a MAC CE, and DCI.

Optionally, the transceiver 1020 is configured to send a resource area parameter to the terminal device, where the resource area parameter is used to indicate a frequency domain range that can be occupied by at least one transmission resource chunk of the plurality of transmission resource chunks, and the at least one transmission resource chunk includes the first transmission resource chunk or the second transmission resource chunk.

Optionally, the transceiver 1020 is configured to send a second configuration message to the terminal device, where the second configuration message is used to indicate the resource area parameter, and the second configuration message is at least one of a network broadcast message, a network system message, an RRC message, a MAC CE, and DCI.

Optionally, the frequency domain range that can be occupied by the at least one transmission resource chunk and that is indicated by the resource area parameter is discontinuous.

It should be understood that the network device 1000 according to this embodiment of this application may correspond to the network device 600 in the embodiments of this application, and may correspond to a corresponding entity for performing the method 200 in the embodiments of this application. The foregoing and other operations and/or functions of the units of the network device 1000 are separately used to implement the corresponding procedures of the network device in the methods in FIG. 1 to FIG. 8. For the purpose of conciseness, details are not described herein again.

Therefore, the network device in this embodiment of this application configures the plurality of transmission resource chunks for uplink transmission of the terminal device, sends the frequency domain offset between any two neighboring transmission resource chunks of the plurality of transmission resource chunks to the terminal device, and may further configure a frequency domain range that can be occupied by at least one transmission resource chunk of the plurality of transmission resource chunks for the terminal device, so that the terminal device can determine the frequency domain location of the plurality of transmission resource chunks according to the frequency domain offset and the frequency domain range that can be occupied. Therefore, a configuration manner of the network device is simple, the terminal device may obtain a frequency domain diversity gain, and transmission resource fragmentation is avoided.

Figure 17:
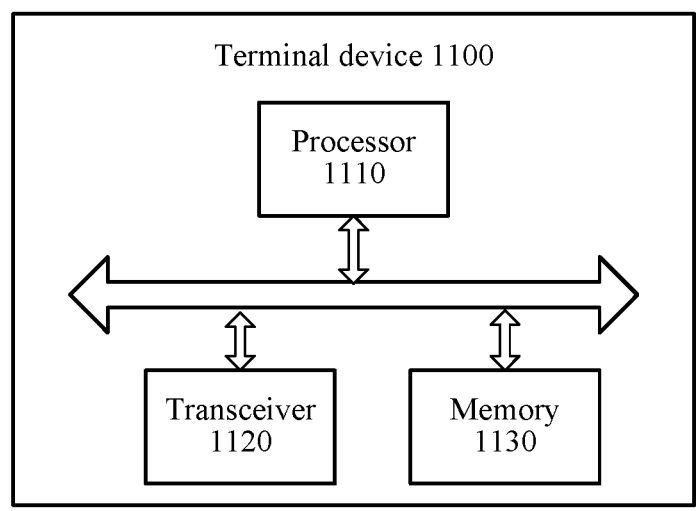
FIG. 17 is a schematic chunk diagram of a terminal device according to still another embodiment of this application.

FIG. 17 is a schematic chunk diagram of a terminal device 1100 according to an embodiment of this application. As shown in FIG. 17, the terminal device 1100 includes: a processor 1110 and a transceiver 1120, where the processor 1110 and the transceiver 1120 are connected. Optionally, the terminal device 1100 further includes a memory 1130, where the memory 1130 and the processor 1110 are connected. The processor 1110, the memory 1130, and the transceiver 1120 communicate with each other and transfer and/or control a data signal through an internal connection path. The memory 1130 may be configured to store an instruction, and the processor 1110 is configured to execute the instruction stored by the memory 1130, to control the transceiver 1120 to send information or a signal. The processor 1110 is configured to determine a resource area parameter, where the resource area parameter is used to indicate a frequency domain range that can be occupied by at least one transmission resource chunk of a plurality of transmission resource chunks allocated by a network device; and determine the plurality of transmission resource chunks according to the resource area parameter.

Optionally, the transceiver 1120 is configured to receive the resource area parameter sent by the terminal device.

Optionally, the transceiver 1120 is configured to receive a configuration message sent by the network device, where the configuration message is used to indicate the resource area parameter, and the configuration message is at least one of a network broadcast message, a network system message, an RRC message, a MAC CE, and DCI.

Optionally, the frequency domain range that can be occupied by the at least one transmission resource chunk and that is indicated by the resource area parameter is discontinuous.

It should be understood that the terminal device 1100 according to this embodiment of this application may correspond to the terminal device 700 in the embodiments of this application, and may correspond to a corresponding entity for performing the method 300 in the embodiments of this application. The foregoing and other operations and/or functions of the units of the terminal device 1100 are separately used to implement the corresponding procedures of the terminal device in the methods in FIG. 9 and FIG. 10. For the purpose of conciseness, details are not described herein again.

Therefore, the terminal device in this embodiment of this application determines the resource area parameter, where the resource area parameter is used to indicate the frequency domain range that can be occupied by at least one transmission resource chunk of the plurality of transmission resource chunks allocated by the network device, and determines the plurality of transmission resource chunks in the range indicated by the resource area parameter, so that the terminal device may perform uplink transmission by using the plurality of transmission resource chunks, to improve transmission efficiency.

Figure 18:
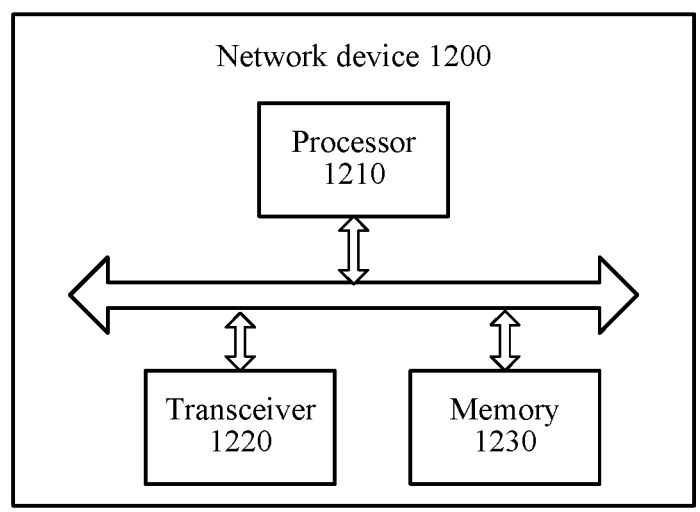
FIG. 18 is a schematic chunk diagram of a network device according to still another embodiment of this application.

FIG. 18 is a schematic chunk diagram of a network device 1200 according to an embodiment of this application. As shown in FIG. 18, the network device 1200 includes: a processor 1210 and a transceiver 1220, where the processor 1210 and the transceiver 1220 are connected. Optionally, the network device 1200 further includes a memory 1230, where the memory 1230 and the processor 1210 are connected. The processor 1210, the memory 1230, and the transceiver 1220 communicate with each other and transfer and/or control a data signal through an internal connection path. The memory 1230 may be configured to store an instruction, and the processor 1210 is configured to execute the instruction stored by the memory 1230, to control the transceiver 1220 to send information or a signal. The processor 1210 is configured to determine a resource area parameter of a terminal device, where the resource area parameter is used to indicate a frequency domain range that can be occupied by at least one transmission resource chunk of a plurality of transmission resource chunks allocated to the terminal device; and the transceiver 1220 is configured to send the resource area parameter to the terminal device.

Optionally, the transceiver 1220 is configured to send a configuration message to the terminal device, where the configuration message is used to indicate the resource area parameter, and the configuration message is at least one of a network broadcast message, a network system message, an RRC message, a MAC CE, and DCI.

Optionally, the frequency domain range that can be occupied by the at least one transmission resource chunk and that is indicated by the resource area parameter is discontinuous.

It should be understood that the network device 1200 according to this embodiment of this application may correspond to the network device 800 in the embodiments of this application, and may correspond to a corresponding entity for performing the method 400 in the embodiments of this application. The foregoing and other operations and/or functions of the units of the network device 1200 are separately used to implement the corresponding procedures of the network device in the methods in FIG. 9 and FIG. 10. For the purpose of conciseness, details are not described herein again.

Therefore, the network device in this embodiment of this application configures the plurality of transmission resource chunks for the terminal device, and sends, to the terminal device, the resource area parameter used to indicate the frequency domain range that can be occupied by at least one transmission resource chunk of the plurality of transmission resource chunks, so that the terminal device can determine the plurality of transmission resource chunks in the range indicated by the resource area parameter, and perform uplink transmission by using the plurality of transmission resource chunks, to improve transmission efficiency.

It should be noted that the method embodiments of this application may be applied to a processor or implemented by a processor. The processor may be an integrated circuit chip having a signal processing capability. In an implementation process, the steps of the foregoing method embodiments may be implemented by using a hardware integrated logic circuit in the processor or instructions in a form of software. The processor may be a general-purpose processor, a digital signal processor (DSP), an application-specific integrated circuit (ASIC), a field programmable gate array (FPGA), or other programmable logic devices, discrete gate or transistor logic devices, and discrete hardware components. The processor may implement or perform the methods, the steps, and logical chunk diagrams that are disclosed in the embodiments of this application. The general-purpose processor may be a microprocessor, or the processor may be any conventional processor or the like. Steps of the methods disclosed with reference to the embodiments of this application may be directly performed and completed by using a hardware decoding processor, or may be performed and completed by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash. A volatile memory may be a random access memory (RAM), and is used as an external cache. RAMs in many forms such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM) may be used, which is used as an example but is not a limitative description. It may be understood that the memory in the system and method described in this specification intends to include, but is not limited to, these memories and any other memory of a suitable type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource configuration method comprising:
   determining a frequency domain offset between a plurality of transmission resource chunks allocated by a network device, wherein the frequency domain offset is a frequency domain offset between a first transmission resource chunk and a second transmission resource chunk, and the first transmission resource chunk and the second transmission resource chunk are any two consecutive resource chunks on an uplink transmission in the plurality of transmission resource chunks;
   determining the plurality of transmission resource chunks according to the frequency domain offset, wherein the plurality of transmission resource chunks are configured for a frequency hopping transmission; and
   determining a resource area parameter, wherein the resource area parameter is used to indicate a frequency domain range that can be occupied by at least one transmission resource chunk of the plurality of transmission resource chunks, and the at least one transmission resource chunk comprises the first transmission resource chunk or the second transmission resource chunk;
   wherein determining the plurality of transmission resource chunks according to the frequency domain offset, comprises determining the plurality of transmission resource chunks according to the frequency domain offset and the resource area parameter.

2. The method of claim 1 wherein the frequency hopping transmission is a physical uplink shared channel (PUSCH) frequency hopping transmission.

3. The method of claim 1 wherein the frequency domain offset is a difference between a start location of the first transmission resource chunk in frequency domain and a start location of the second transmission resource chunk in frequency domain.

4. The method of claim 1 wherein:
   the first transmission resource chunk and the second transmission resource chunk separately occupy a subframe or a mini-subframe;
   the first transmission resource chunk occupies a first part of a subframe and the second transmission resource chunk occupies a second part of the subframe; or
   the first transmission resource chunk occupies a first part of a mini-subframe and the second transmission resource chunk occupies a second part of the mini-subframe.

5. The method of claim 1 wherein determining a frequency domain offset between a plurality of transmission resource chunks allocated by a network device comprises:
   receiving a first configuration message sent by the network device, wherein the first configuration message is used to indicate the frequency domain offset, and the first configuration message is at least one of a network broadcast message, a network system message, a Radio Resource Control (RRC) message, a Media Access Control control element (MAC CE), or downlink control information (DCI).

6. The method of claim 1 wherein, if the frequency domain of the second transmission resource chunk exceeds a frequency domain range indicated by a resource region parameter, the frequency domain that is not exceeded in the frequency domain of the second transmission resource chunk occupies a first frequency domain position within the frequency domain range indicated by the resource region parameter, the frequency domain exceeded in the frequency domain of the second transmission resource chunk occupies a second frequency domain position within the frequency domain range indicated by the resource region parameter, wherein the first frequency domain position does not overlap with the second frequency domain position.

7. The method of claim 1 wherein determining a resource area parameter comprises r receiving a second configuration message sent by the network device, wherein the second configuration message is used to indicate the resource area parameter, and wherein the second configuration message is at least one of a network broadcast message, a network system message, a Radio Resource Control (RRC) message, a Media Access Control control element (MAC CE), or downlink control information (DCI).

8. A terminal device comprising:
a memory configured to store computer-executable instructions; and
one or more processors in communication with the memory and configured to execute the computer-executable instructions to at least:
determine a frequency domain offset between a plurality of transmission resource chunks allocated by a network device, wherein the frequency domain offset is a frequency domain offset between a first transmission resource chunk and a second transmission resource chunk, and the first transmission resource chunk and the second transmission resource chunk are any two consecutive resource chunks on an uplink transmission in the plurality of transmission resource chunks;
determine the plurality of transmission resource chunks according to the frequency domain offset, wherein the plurality of transmission resource chunks are configured for a frequency hopping transmission; and
determine a resource area parameter, wherein the resource area parameter is used to indicate a frequency domain range that can be occupied by at least one transmission resource chunk of the plurality of transmission resource chunks, and wherein the at least one transmission resource chunk comprises the first transmission resource chunk or the second transmission resource chunk;
wherein determining the plurality of transmission resource chunks according to the frequency domain offset comprises determining the plurality of transmission resource chunks according to the frequency domain offset and the resource area parameter.

9. The terminal device of claim 8, wherein the frequency hopping transmission is a physical uplink shared channel (PUSCH) frequency hopping transmission.

10. The terminal device of claim 8 wherein the frequency domain offset is a difference between a start location of the first transmission resource chunk in frequency domain and a start location of the second transmission resource chunk in frequency domain.

11. The terminal device of claim 8 wherein:
the first transmission resource chunk and the second transmission resource chunk separately occupy a subframe or a mini-subframe;
the first transmission resource chunk occupies a first part of a subframe and the second transmission resource chunk occupies a second part of the subframe; or the first transmission resource chunk occupies a first part of a mini-subframe and the second transmission resource chunk occupies a second part of the mini-subframe.

12. The terminal device of claim 8 wherein the terminal device further comprises a communications interface, configured to receive a first configuration message sent by the network device, wherein the first configuration message is used to indicate the frequency domain offset, and wherein the first configuration message is at least one of a network broadcast message, a network system message, a Radio Resource Control (RRC) message, a Media Access Control control element (MAC CE), or downlink control information (DCI).

13. The terminal device of claim 8 wherein, if the frequency domain of the second transmission resource chunk exceeds a frequency domain range indicated by a resource region parameter, the frequency domain that is not exceeded in the frequency domain of the second transmission resource chunk occupies a first frequency domain position within the frequency domain range indicated by the resource region parameter, the frequency domain exceeded in the frequency domain of the second transmission resource chunk occupies a second frequency domain position within the frequency domain range indicated by the resource region parameter, wherein the first frequency domain position does not overlap with the second frequency domain position.

14. The terminal device of claim 8 wherein the terminal device further comprises a communications interface configured to receive a second configuration message sent by the network device, wherein the second configuration message is used to indicate the resource area parameter, and wherein the second configuration message is at least one of a network broadcast message, a network system message, an RRC message, a MAC CE, or DCI.

15. A non-transitory computer-readable storage medium storing computer-executable instructions that, when executed by a computer system, configure the computer system to perform operations comprising:
determining a frequency domain offset between a plurality of transmission resource chunks allocated by a network device, wherein the frequency domain offset is a frequency domain offset between a first transmission resource chunk and a second transmission resource chunk, and the first transmission resource chunk and the second transmission resource chunk are any two consecutive resource chunks on an uplink transmission in the plurality of transmission resource chunks;
determining the plurality of transmission resource chunks according to the frequency domain offset, wherein the plurality of transmission resource chunks are configured for a frequency hopping transmission; and
if the frequency domain of the second transmission resource chunk exceeds a frequency domain range indicated by a resource region parameter, the frequency domain that is not exceeded in the frequency domain of the second transmission resource chunk occupies a first frequency domain position within the frequency domain range indicated by the resource region parameter, the frequency domain exceeded in the frequency domain of the second transmission resource chunk occupies a second frequency domain position within the frequency domain range indicated by the resource region parameter, wherein the first frequency domain position does not overlap with the second frequency domain position.

16. The non-transitory computer-readable storage medium of claim 15 wherein the frequency hopping transmission is a physical uplink shared channel (PUSCH) frequency hopping transmission.

17. The non-transitory computer-readable storage medium of claim 15 wherein the frequency domain offset is a difference between a start location of the first transmission resource chunk in frequency domain and a start location of the second transmission resource chunk in frequency domain.

18. The non-transitory computer-readable storage medium of claim 15 wherein:
the first transmission resource chunk and the second transmission resource chunk separately occupy a subframe or a mini-subframe;
the first transmission resource chunk occupies a first part of a subframe and the second transmission resource chunk occupies a second part of the subframe; or
the first transmission resource chunk occupies a first part of a mini-subframe and the second transmission resource chunk occupies a second part of the mini-subframe.

19. The non-transitory computer-readable storage medium of claim 15 wherein determining a frequency domain offset between a plurality of transmission resource chunks allocated by a network device comprises receiving a first configuration message sent by the network device, wherein the first configuration message is used to indicate the frequency domain offset, and the first configuration message is at least one of a network broadcast message, a network system message, a Radio Resource Control (RRC) message, a Media Access Control control element (MAC CE), or downlink control information (DCI).

* * * * *